United States Patent [19]

Parker

[11] Patent Number: 5,601,836
[45] Date of Patent: Feb. 11, 1997

[54] NUTRITIONAL SUPPLEMENT FOR CALVING RUMINANT ANIMALS

[75] Inventor: Richard B. Parker, Portland, Oreg.

[73] Assignee: Great Lakes Biochemical Company, Inc., Milwaukee, Wis.

[21] Appl. No.: 189,695

[22] Filed: Feb. 1, 1994

Related U.S. Application Data

[63] Continuation-in-part of Ser. No. 84,862, Jun. 28, 1993, abandoned.

[51] Int. Cl.$^6$ .................................................. A61K 9/00
[52] U.S. Cl. .......................... 424/438; 424/439; 424/484; 514/944
[58] Field of Search .................................. 424/438, 439, 424/484; 514/944

[56] References Cited

FOREIGN PATENT DOCUMENTS 2153670  8/1985  United Kingdom .

OTHER PUBLICATIONS

Reinhardt, T. A., et al. (1988). *Vet. Clin. N. Am.* vol. 4, No. 2, pp. 331–350.
World Review of Animal Production, vol. XXI, No. 3, 1985, pp. 59–62.
World Review of Animal Production, vol. XXI No. 3, 1985, pp. 53–57.

*Primary Examiner*—Raj Bawa
*Attorney, Agent, or Firm*—McAndrews, Held & Malloy, Ltd.

[57] ABSTRACT

The method of the present invention is directed to a nutritional supplement for ruminant animals at or about the time of freshening. The nutritional supplement comprises, in unit dosage form, prophylactically effective amounts of calcium propionate, or mixture of calcium propionate and calcium oxide, and a water soluble magnesium salt, as active ingredients in a pharmaceutically acceptable gel carrier that imparts flowability to the nutritional supplement. The present invention is also directed to a method of preventing or inhibiting a triad of diseases—hypocalcemia, ketosis and tetany—that commonly occur in ruminant animals during freshening. The method of the present invention comprises administering to a ruminant animal during its time of freshening, the above described nutritional supplement in a unit dose form.

25 Claims, No Drawings

NUTRITIONAL SUPPLEMENT FOR CALVING RUMINANT ANIMALS

CROSS-REFERENCE TO RELATED APPLICATIONS

This is a continuation-in-part of U.S. Ser. No. 08/084,862, filed Jun. 28, 1993, now abandoned.

BACKGROUND OF THE INVENTION a. Field of the Invention

The present invention is directed to the field of nutritional supplements for ruminant animals, especially dairy cattle, during calving. More particularly, the present invention is directed to a nutritional supplement in a unit dosage form that is capable of preventing or minimizing the effects of three ailments that commonly afflict calving ruminant animals, especially calving dairy cattle.

The present invention is useful because it is capable of preventing and/or inhibiting one of more of the three serious ailments of calving ruminant animals and the subsequent need for veterinary treatment.

b. Background

There is a triad of ailments that commonly afflict ruminants, particularly dairy cattle, at the time of calving, which is also known as "freshening."

The first ailment is metabolic and it concerns the animal's need for calcium. The demand for calcium comes from the heavy milk production at freshening. This demand is even greater in dairy cattle. During freshening, the udder of the lactating animal extracts calcium from the blood and converts it into calcium caseinate—a milk protein. Normally, the extracted calcium is replaced by calcium absorbed from the rumen. However, if there is insufficient calcium in the rumen to replace the calcium extracted by the udder, the animal's blood calcium concentration falls. A low blood calcium means that less calcium is available for muscle tissue contraction and the cow goes "down." This condition is commonly referred to as "down cow" syndrome or "milk fever." Medically, the condition is known as "hypocalcemia." Regardless of its name, the condition is not always foreseen. Thus, any treatment is usually in response to the problem and not directed to preventing the condition. However, treatment is not an adequate substitute for prevention, since even with treatment, the animal may suffer some permanent damage.

The treatment of "hypocalcemia" or "down cow" syndrome is most commonly done orally with calcium chloride. However, calcium chloride has its drawbacks as it may cause throat lesions, dehydration and is so unpalatable to the animal that the animal must be held down during administration. Generally, the calcium chloride is administered as a liquid or gel-type product and is applied directly to the back of the animal's tongue or throat.

An alternative treatment is by intravenous injection of an organic salt, such as calcium gluconate or chelated calcium; however, this must be done by a veterinarian which is costly.

A second problem of ruminant animals during freshening is a condition known as ketosis. This may or may not occur with hypocalcemia. At the start of lactation, there is a sudden and heavy demand for the production of lactose for the milk. This causes a depletion of the animal's blood sugar (glucose). If the animal does not have a sufficient reserve of carbohydrate in the liver and/or a sufficient source in the feed, then it must rely on an alternative source of energy, its own body fat. When fat is metabolized, the result is not glucose but ketone. While ketones can provide energy to muscle, they cannot supply energy needed as glucose, to the brain. As a result, the animal may become anorexic or exhibit bizarre behavior. The condition is also known as hypoglycemia.

The main source of glucose for the cow is found in propionic acid which is produced in the rumen. Propylene glycol can also be administered and serve as a source of propionate which in turn can be converted into blood glucose.

Treatment here again tends to wait for the onslaught of the problem rather than prevention. This is because the treatment has been by intravenous injection of glucose which must be administered by a veterinarian.

A third metabolic problem may occur when dairy cattle feed on high phosphate grasses. In this instance, the phosphate pairs up with the magnesium in the animal's urine and the animal may excrete more magnesium than it receives in its feed. This scenario may result in a metabolic disease called grass tetany or hypomagnesiumemia.

SUMMARY OF THE INVENTION

The present invention is directed to a nutritional supplement for ruminant animals that is capable of inhibiting or preventing the triad of diseases that commonly occur at or about the time of freshening. The triad of diseases are hypocalcemia, ketosis, and tetany. The nutritional supplement of the present invention, while having only two or three active ingredients, is capable of inhibiting or preventing the onset of the three diseases forming the triad. In the nutritional supplement of the present invention, the calcium is present in a form that allows it to be orally administered to the animal without causing throat lesions, dehydration, or being so unpalatable that the animal must be held down.

In particular, the present invention is directed to a nutritional supplement for ruminant animals at or about their time of freshening, the nutritional supplement comprising in unit dosage form, prophylactically effective amounts of calcium ions, propionate ions, and magnesium ions as the active ingredients, in a pharmaceutically acceptable gel carrier that imparts flowability to the nutritional supplement, the prophylactically effective amounts of calcium, propionate and magnesium ions being capable of preventing or inhibiting the triad of diseases that commonly occur in ruminant animals during freshening. The nutritional supplement of the present invention preferably contains calcium propionate, or a mixture of calcium propionate and calcium oxide, and a magnesium salt as the sources for the prophylactically effective amounts of calcium, propionate and magnesium. Optionally, the nutritional supplement of the present invention also includes an effective amount of an inert binder for modifying the flow characteristics of the nutritional supplement.

The present invention further includes a method for preventing the triad of diseases—hypocalcemia, ketosis and tetany—that commonly occur in ruminant animals during freshening. The method comprises the step of administering to a ruminant animal during its time of freshening, a flowable unit dose of a nutritional supplement comprising prophylactically effective amounts of calcium propionate, or a mixture of calcium propionate and calcium oxide, and a water soluble magnesium salt, as active agents, in a pharmaceutically acceptable gel carrier that imparts flowability to the nutritional supplement. The above described method is capable of inhibiting or preventing hypocalcemia, ketosis, and/or tetany in a ruminant animal during freshening. The preferred ruminant animal of the present invention is a dairy cow.

DETAILED DESCRIPTION OF THE INVENTION

The present invention has two aspects. In its first aspect, the present invention is directed to a nutritional supplement for ruminant animals at their time of freshening. The nutritional supplement of the present invention is capable of preventing and/or inhibiting the triad of ailments that commonly affect ruminant animals during freshening. These ailments are hypocalcemia (low blood calcium), ketosis (the presence of elevated concentrations of ketone bodies (acetone) in the blood), and tetany (a muscle disease associated with muscle twitching, cramps and convulsions). By the term "ruminant animals" is meant any hoofed animal having a rumen. Preferred ruminant animals are the commercially important farm animals, such as dairy cows, goats and cattle, most preferably, dairy cows.

The nutritional supplement of the present invention comprises in unit dose form, prophylactically effective amounts of calcium, propionate, and magnesium ions as active ingredients that are carried in a pharmaceutically acceptable gel carrier that imparts flowability to the nutritional supplement. Preferably, calcium propionate, or a mixture of calcium propionate and calcium oxide, and a water soluble magnesium salt are the sources for the prophylactically effective amounts of calcium, propionate and magnesium ions.

The first component in the nutritional supplement—calcium propionate—inhibits and/or prevents two of the triad of ailments during freshening—hypocalcemia and ketosis. The use of calcium propionate avoids the throat lesions or dehydration associated with the calcium chloride treatments of the prior art. Moreover, because the animal does not find the taste of calcium propionate objectionable, the animal will take the supplement readily. Further, the propionate component of calcium propionate provides the animal with a source for propionic acid and thus glucose, thereby preventing or inhibiting the onset of hypoglycemia and ketosis. Because the propionate is a direct source of propionic acid, it offers advantages over the conventionally used propylene glycol, which the animal must first convert into propionic acid. Because the propionate is utilized by the animal, it does not cause dehydration, as does the chloride ion (of calcium chloride) which must be excreted in the urine.

In order to increase the amount of calcium in the nutritional supplement, calcium oxide, which has a higher percentage of calcium by weight than calcium propionate, can be substituted for some of the calcium propionate. The maximum amount of calcium oxide that can be substituted for the calcium propionate is about 80% by weight. When greater than about 80% by weight calcium oxide is substituted, the advantages of having propionate present in the supplement are virtually lost. This is because the propionate is also used to supply energy to move the calcium into the animal tissues, and there is insufficient additional propionate to prevent or inhibit ketosis.

Any pharmaceutical grade of calcium propionate or calcium oxide is suitable for use in the present invention. One commercially available source of pharmaceutical grade calcium propionate is Niacet Corp. of Niagara Falls, N.Y.

The second component in the nutritional supplement of the present invention is a water soluble pharmaceutical grade magnesium salt. The water soluble magnesium salt that is utilized must be capable of providing magnesium to the animal in a useable form that supplements the excessive loss of magnesium that occurs when the animal feeds on high phosphate grasses. A suitable water soluble magnesium salt is magnesium sulfate or magnesium propionate.

Any pharmaceutical grade of magnesium sulfate or magnesium propionate may be used in the present invention. A suitable pharmaceutical grade magnesium sulfate is commercially available from Giles Chemical, Waynesville, N.C., as magnesium sulfate U.S.P. The ratio by weight of calcium propionate, or mixture of calcium propionate and calcium oxide, to the water soluble magnesium salt is preferably within the range of 5:1 to 12:1, more preferably between 7:1 to 9:1.

The third component of the nutritional supplement of the present invention is a pharmaceutically acceptable gel carrier. An important property of the pharmaceutically acceptable gel carrier is its ability to retain flowability when carrying both the calcium propionate and the magnesium sulfate. Propylene glycol is unsuitable for this purpose because it stiffens into a non-flowable form when combined with calcium propionate. By "flowability" is meant having a sufficient viscosity so as not to run out of the nozzle or the back end of the barrel of a dispensing tube having dimensions of a 10–10½ inch barrel length, a 1½ inch inside diameter barrel, a 1½–3 inch nozzle length and a ¼–½ inch nozzle diameter, yet not so viscous that the animal cannot swallow the nutritional supplement, or so viscous that the nutritional supplement cannot be dispensed out of the dispensing tube. A nutritional supplement having a viscosity within the range of about 200,000 to about 1,000,000 cps will have suitable flowability. A viscosity of about 600,000 cps is preferred. A pharmaceutically acceptable gel carrier is polyethylene glycol, preferably with a molecular weight within the range of about 200–800 daltons. A dalton is defined as $\frac{1}{16}$ the mass of oxygen$^{16}$ and is equivalent to 0.9997 atomic mass unit.

When polyethylene glycol is the carrier, the nutritional supplement of the present invention will retain flowability if the calcium propionate, or mixture of calcium propionate and calcium oxide, and the water soluble magnesium salt are maintained within certain limits. In particular, for polyethylene glycol, flowability is retained if the amount of polyethylene glycol in the nutritional supplement is about 85% to 180% of the weight of the calcium propionate, or mixture of calcium propionate and calcium oxide, in the composition. Preferably, the polyethylene glycol in the nutritional supplement is between 85 and 108% of the weight of the calcium propionate, or mixture of calcium propionate and calcium oxide. Under these formulations, the amount of water soluble magnesium salt should not exceed 12% of the total weight of the nutritional supplement.

Optionally, the nutritional supplement of the present invention may include, as a fourth component, an effective amount of an inert binder for moderating the flowability of the gel. An effective amount of the binder is an amount necessary to obtain flowability of the nutritional supplement. A suitable inert binder is silicon dioxide. Preferably, the silicon dioxide has a grain size less than 0.02 microns. When present, the concentration of silicon dioxide binder in the nutritional supplement is between 0.1% and 6.5% by weight, preferably between 0.3% and 3% by weight.

The nutritional supplement of the present invention comprises from about 42–50% by weight calcium propionate, or mixture of calcium propionate and calcium oxide, from about 1–12% by weight magnesium salt, from about 0–6.5% by weight inert binder, and from about 35–63% by weight carrier.

In one embodiment of the nutritional supplement, containing silica, the proportion of individual components is as follows:

| Calcium propionate | 47.65% |
|---|---|
| Magnesium sulfate | 6.00% |
| Polyethylene glycol | 42.00% |
| Silicon dioxide | 0.35% |

In a second embodiment, in which both calcium propionate and calcium oxide are present, the proportion of individual components in the nutritional supplement is as follows:

| Calcium propionate | 36.0% |
|---|---|
| Calcium oxide | 12.0% |
| Magnesium sulfate | 8.0% |
| Silicon dioxide | 2.6% |
| Polyethylene glycol | 41.4% |

The prophylactically effective amounts of the calcium propionate, or mixture of calcium propionate and calcium oxide, and the water soluble magnesium salt vary according to the size, species, and condition of the ruminant animal. However, one of ordinary skill in the art can readily determine the prophylactically effective amount of each component for any species by first administering a small amount to the animal and by gradually increasing the amounts until a prophylactic but non-toxic amount is administered.

For example, in the case of dairy cows, having an average weight between 800 and 1800 pounds, the prophylactically effective amount of calcium propionate, or mixture of calcium propionate and calcium oxide, is within the range of 70 to 280 grams, while the prophylactically effective amount of magnesium sulfate (or magnesium propionate) is within the range of 12 to 36 grams. The prophylactically effective amount of calcium ions is within the range of about 25–180 grams, the prophylactically effective amount of propionate ions is within the range of about 9–181 grams, and the prophylactically effective amount of magnesium ions is within the range of about 2–9 grams. The amount of polyethylene glycol that is suitable for carrying these active agents is between 65 and 260 ml.

The nutritional supplement of the present invention is in unit dose form. By "unit dose form" is meant a single dose of the nutritional supplement that is capable of exerting a prophylactic effect on the ruminant animal against the triad of diseases that are commonly associated with freshening. A typical unit dose for an animal between 800 and 1800 pounds is between about 150 and 450 cc. However, it is within the scope of the present invention to make the unit dose more or less dilute as needed or desired under the circumstances. A convenient unit dose size is about 300 cc.

The nutritional supplement of the present invention is capable of being administered by a farmer, herdsman, or keeper without assistance. Several embodiments of the unit dose are possible. In one embodiment, the unit dose is contained within a sealed tube having a nozzle for dispensing on one end, and a movable piston at the other end that is capable of compressing and dispensing the tube's contents (hereinafter "dispensing tube"). In this embodiment, the dispensing tube which resembles a tube of caulk, is placed in a gun resembling a caulking gun. The nozzle is placed in the back of the animal's mouth or throat, and the dose is dispensed.

In another embodiment, the outlet of the dispensing tube or syringe is capable of being connected to a soft plastic hose or cannula of sufficient length to at least reach the back of the animal's mouth or the throat. Once the hose or cannula is inserted into the animal's mouth or throat, the dose is dispensed. In another embodiment, a unit dose is maintained in a sealed vial until it is ready to use. Then, it is taken up in a syringe for injection into the mouth or throat of the animal as described above. A typical unit dose is contained in about 300 cc of the gel described above.

The nutritional supplement of the present invention is stable for 24 months in unit dosage form.

In its second aspect, the present invention is directed to a method for preventing or inhibiting the triad of diseases—hypocalcemia, ketosis and tetany—that occur in ruminant animals during freshening. The method comprises the step of:

administering to a ruminant animal at or about the time of freshening, a unit dose comprising in combination prophylactically effective amounts of calcium propionate, or a mixture of calcium propionate and calcium oxide, and a water soluble magnesium salt in a pharmaceutically acceptable gel carrier (preferably, polyethylene glycol) that is capable of providing flowability to said nutritional supplement, whereby hypocalcemia, ketosis and/or tetany is inhibited or prevented in the ruminant animal during freshening.

It is within the scope of the present invention that one or more unit doses be administered to the ruminant animal just prior to and/or after calving. By generally observing the animals and their feed, the farmer, herdsman or keeper would be able to determine whether additional doses should be administered to the various members of the herd which are suspect but not yet manifesting symptoms.

What is claimed is:

1. A nutritional supplement for ruminant animals comprising in unit dosage form, a prophylactically effective amount of a calcium compound selected from the group consisting of calcium propionate and a mixture of calcium propionate and calcium oxide, and about 1% to about 12% by weight based on the total weight of the nutritional supplement of a water soluble magnesium salt as active ingredients in a polyethylene glycol gel carrier present in an amount of 85%–180% by weight based on the weight of the calcium compound effective to impart flowability to said nutritional supplement, said nutritional supplement being capable of inhibiting or preventing the onset of a triad of ailments—hypocalcemia, ketosis and tetany—that occur in ruminant animals during freshening.

2. The nutritional supplement of claim 1 wherein the polyethylene glycol has a molecular weight between 200 and 800 daltons.

3. The nutritional supplement of claim 1 wherein the calcium compound contains from 0 to about 80% by weight calcium oxide and from about 20% to 100% by weight calcium propionate.

4. The nutritional supplement of claim 1 wherein the water soluble magnesium salt is selected from the group consisting of magnesium sulfate and magnesium propionate.

5. The nutritional supplement of claim 4 further containing an effective amount of an inert binder.

6. The nutritional supplement of claim 5 wherein the inert binder is silicon dioxide.

7. The nutritional supplement of claim 4, comprising the calcium compound and magnesium sulfate in a ratio by weight of between about 5:1 and about 12:1.

8. The nutritional supplement of claim 7 wherein said ratio is between about 7:1 and about 9:1.

9. The nutritional supplement of claim 2 wherein the amount of polyethylene glycol is from about 85% to about 108% of the weight of the calcium compound.

10. The nutritional supplement of claim 1 wherein the nutritional supplement has a viscosity within the range of from about 200,000 to about 1,000,000 cps.

11. A nutritional supplement for ruminant animals in unit dose form comprising from about 70 to about 280 g of a calcium compound selected from the group consisting of calcium propionate and a mixture of calcium propionate and calcium oxide and from about 12 to about 36 g of a water soluble magnesium salt in from about 65 to about 260 ml of a polyethylene glycol gel carrier having a molecular weight of between about 200 and about 800 daltons, said nutritional supplement having flowability and being capable of inhibiting or preventing the onset of a triad of ailments—hypocalcemia, ketosis and tetany—that occur in ruminant animals during freshening.

12. The nutritional supplement of claim 11 wherein the water soluble magnesium salt is selected from the group consisting of magnesium sulfate, magnesium propionate and mixtures thereof.

13. The nutritional supplement of claim 1 wherein the unit dose is provided in a dispensing appliance.

14. A chemical composition comprising from about 42% to about 50% by weight of a calcium compound selected from the group consisting of calcium propionate and a mixture of calcium propionate and calcium oxide, from about 1 to about 12% by weight of a water soluble magnesium salt, and from about 35% to about 63% by weight of a polyethylene glycol gel carrier present in an amount effective to impart to said nutritional supplement a viscosity in the range of from about 200,000 to about 1,000,000 cps.

15. A method for inhibiting or preventing the triad of diseases—hypocalcemia, ketosis and tetany—that occur in ruminant animals during freshening, comprising, administering to a ruminant animal at about the time of freshening, a unit dose comprising in combination prophylactically effective amounts of a calcium compound selected from the group consisting of calcium propionate and a mixture of calcium propionate and calcium oxide, and about 1% to about 12% by weight based on the total weight of the nutritional supplement of a water soluble magnesium salt in a polyethylene glycol gel carrier present in an amount of 85%–180% by weight based on the weight of the calcium compound effective to impart flowability to said nutritional supplement, whereby hypocalcemia, ketosis and/or tetany is inhibited or prevented in the ruminant animal during freshening.

16. The method of claim 15 wherein the ruminant animal is a dairy cow.

17. The method of claim 15 wherein the polyethylene glycol has a molecular weight between 200 and 800 daltons.

18. The method of claim 15 wherein the unit dose further includes an effective amount of an inert binder.

19. The method of claim 18 wherein the inert binder is silicon dioxide.

20. The method of claim 15 wherein the calcium compound and the water soluble magnesium salt are present in a ratio by weight between about 5:1 and about 12:1.

21. The method of claim 20 wherein the ratio by weight is between 7:1 and 9:1.

22. The method of claim 15 wherein the water soluble magnesium salt is selected from the group consisting of magnesium sulfate or magnesium propionate.

23. A method for inhibiting or preventing the triad of diseases—hypocalcemia, ketosis and tetany—that occur in ruminant animals during freshening, comprising, administering to a ruminant animal at about the time of freshening, a unit dose selected from the group consisting of calcium propionate and a mixture of calcium propionate and calcium oxide and from about 12 to about 36 g of a water soluble magnesium salt, wherein the said calcium and magnesium salts are in about 65 to about 260 ml of polyethylene glycol gel carrier having a molecular weight between 200 and 800 daltons, said unit dose having flowability, whereby hypocalcemia, ketosis and/or tetany is inhibited or prevented in the ruminant animal during freshening.

24. The method of claim 15 wherein the unit dose is provided in a dispensing appliance.

25. A nutritional supplement for ruminant animals comprising:

A. 42–50% by weight of a calcium source selected from the group consisting of calcium propionate and a mixture of calcium propionate and calcium oxide, based on the weight of said supplement;

B. 1–12% by weight of a water-soluble magnesium salt, based on the weight of said supplement;

C. from 0 to about 6.5% by weight of an inert binder, based on the weight of said supplement; and D. 85% to 180% of a polyethylene glycol gel carrier, based on the weight of said calcium source;

said nutritional supplement having a viscosity within the range of from about 200,000 to about 1,000,000 centipoise.

* * * * *